June 26, 1951  M. DE GROOTE ET AL  2,558,512
PROCESSES FOR BREAKING PETROLEUM EMULSIONS
Filed Nov. 1, 1949
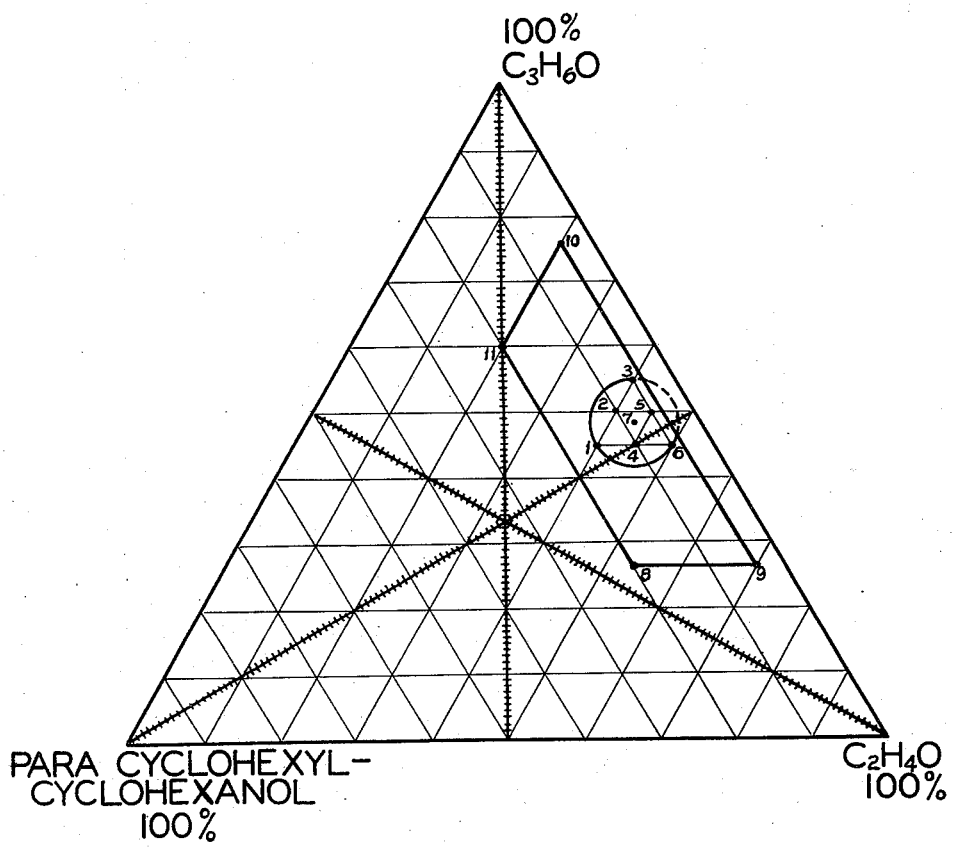
INVENTORS
MELVIN DE GROOTE
ARTHUR F. WIRTEL
OWEN H. PETTINGILL
BY
Wells L. Church
ATTORNEY Patented June 26, 1951

2,558,512

UNITED STATES PATENT OFFICE 2,558,512

PROCESSES FOR BREAKING PETROLEUM EMULSIONS

Melvin de Groote, University City, and Arthur F. Wirtel and Owen H. Pettingill, Kirkwood, Mo., assignors to Petrolite Corporation, Ltd., Wilmington, Del., a corporation of Delaware Application November 1, 1949, Serial No. 124,815

7 Claims. (Cl. 252—331)

This invention relates to processes or procedures particularly adapted for preventing, breaking or resolving emulsions of the water-in-oil type, and particularly petroleum emulsions.

Complementary to the above aspect of the invention herein disclosed is our companion invention concerned with the new chemical products or compounds used as the demulsifying agents in said aforementioned processes or procedures, as well as the application of such chemical compounds, products, or the like, in various other arts and industries, along with the method for manufacturing said new chemical products or compounds which are of outstanding value in demulsification. See our co-pending application, Serial No. 124,816, filed November 1, 1949.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

Briefly stated, the present process is concerned with the breaking of petroleum emulsions by means of certain glycol ethers of para-cyclohexylcyclohexanol, and particularly in the form of cogeneric mixtures, as hereinafter described. These products are obtained by treatment of para-cyclohexylcyclohexanol with ethylene oxide and propylene oxide within the limits and manner hereinafter specified.

It is well known that a variety of compounds containing a reactive hydrogen atom, i. e., a hydrogen atom attached to oxygen, nitrogen, or sulphur, will react with alkylene oxides, particularly ethylene oxide or propylene oxide, to yield the corresponding glycol or polyglycol derivative. Such oxyalkylated derivatives are readily prepared from chemical compounds in which the hydrogen atom is directly attached to oxygen, and particularly in the case of alcohols or phenols such as aliphatic alcohols, phenols, alkylaryl alcohols, alicyclic alcohols, phenoxyalkanols, substituted phenoxyalkanols, etc. Generally speaking, it has been found advantageous to react a water-insoluble hydroxylated material, having 8 carbon atoms or more, with an alkylene oxide so as to introduce water solubility, or, at least, significant or distinct hydrophile character, with the result that the derivative so obtained has surface-active properties.

Examples of suitable reactants of this type include octyl alcohol, decyl alcohol, dodecyl alcohol, tetradecyl alcohol, octadecyl alcohol, butylphenol, propylphenol, propylcresol, hexylphenol, octylphenol, nonylphenol, and cardanol, as well as the corresponding alicyclic alcohols obtained by the hydrogenation of the aforementioned phenols. It has been suggested that at least some of such materials be used in the resolution of petroleum emulsions. As far as we are aware, none of such materials represents products which are acceptable in demulsification today from a competitive standpoint. In the majority of cases, such products are apt to be one-sixth, one-fifth, one-fourth, or one-third as good as available demulsifying agents on the same percentage-of-active material basis, or same cost basis.

We have discovered a very few exceptions to the above general situation. For example, we have discovered, if one treats para-cyclohexylcyclohexanol with ethylene oxide and propylene oxide so as to yield a cogeneric mixture of glycol ethers, that such mixed derivative has unusual properties, provided the composition lies within a certain range, as hereinafter specified. A specific exemplification of this range is the product obtained by treating one mole of para-cyclohexylcyclohexanol with 18 moles of propylene oxide, and then with 21 moles of ethylene oxide. Similarly, one may treat the para-cyclohexylcyclohexanol with the 21 moles of ethylene oxide first and then with the 18 moles of propylene oxide next.

In subsequent paragraphs from time to time reference is made to "compounds of cogeneric mixtures." At first glance, it may appear that such language is indefinite, and perhaps, contradictory. It is the intention at the moment only to point out that there is no inconsistency in such description, and that, subsequently, there will be a complete explanation of why such designation is entirely proper.

Para-cyclohexylcyclohexanol is obtained by the hydrogenation of phenylphenol. The procedure is essentially the same as is employed in the conversion of phenol to cyclohexanol. The molecular weight is 182.

The cogeneric mixtures of glycol ethers of para-cyclohexylcyclohexanol are usually effective demulsifying agents on a comparatively small number of oil field emulsions, which, oddly enough, appear rather widely distributed geographically. These para-cyclohexylcyclohexanol mixtures do not appear to be universally competitive, and, as a matter of fact, appear to be highly selective in regard to their action as demulsifying agents. However, such products have significant utility in a number of different oil fields where they serve better than any other available demulsifying agent. Their utility may, of course, increase as time goes along.

It is very peculiar that the effectiveness of the demulsifying agents herein described seem to be limited to a very narrow range or area as far as composition goes.

The invention will be described by reference to the accompanying drawing which illustrates, in conventional graphical form, compositions used in accordance with the invention in terms of the three components. The figure is the conventional triangular graph showing compositions in terms of the three components. Thus, the drawing illustrates glycol ethers of para-cyclohexylcyclohexanol, or cogeneric mixtures thereof, derivable from para-cyslohexylcyclohexanol and ethylene oxide alone, or para-cyclohexylcyclohexanol and propylene oxide alone, or para-cyclohexylcyclohexanol and both propylene oxide and ethylene oxide, in terms of the initial reagents. We have found that effective demulsifying agents lie approximately within a small and hitherto unsuspected area indicated by the trapezoid of said graph, determined by the points 8, 9, 10 and 11. More specifically, particularly effective demulsifying agents appear within a smaller range, as set forth approximately by the area indicated by the segment of a circle in said graph, in which the area of the segment is limited to derivatives in which para-cyclohexylcyclohexanol contributes at least 4% by weight of the ultimate compound or cogeneric mixture.

The circle itself is identified by the fact that the points 1, 3 and 6 appear on the circle. The more effective of these better compounds or cogeneric mixtures are those which appear within the triangle which represents part of the circle and part of the segment, to wit, the triangle identified by the points 1, 3 and 6. The most effective compounds or cogeneric mixtures of all are those which fall within the inner central triangle of the larger outer triangle identified by the points 1, 3 and 6, to wit, the smaller triangle identified by the points 2, 4 and 5. The most outstanding of these effective compounds or cogeneric mixtures is one which appears to fall substantially at the center of the smaller triangle, identified by point 7. This particular point is obtained by treating one mole of para-cyclohexylcyclohexanol with 18 moles of propylene oxide, followed by treatment with 21 moles of ethylene oxide.

In spite of the unique character of the compounds or cogeneric mixtures previously described we have made additionally an invention within an invention. This can be illustrated by reference to the compounds or cogeneric mixture whose composition is determined by the inner triangle 2, 4, 5. This preferred class of derivatives, or, for that matter, all the herein described products, can be made in three different ways: (a) by adding propylene oxide first and then ethylene oxide; (b) by adding ethylene oxide first and then propylene oxide; or (c) by adding the two oxides of random, indifferent, or uncontrolled addition so as to produce a polyglycol ether in which the propylene radicals and ethylene radicals do not appear in continuous succession but are heterogeneously distributed.

We have found that if propylene oxide is added first and then ethylene oxide is added, the compounds or cogeneric mixtures so obtained are invariably and inevitably more effective as demulsifiers, and are also more effective for other purposes than the comparable glycol ethers of para-cyclohexylcyclohexanol made by combining the three reactants in any other sequence. This will be explained further with additional illustrations subsequently.

As an illustration of the preparation of various compounds or cogeneric mixtures, and particularly the most desirable ones, and also those which are helpful in setting the limits in the graph previously referred to, the following examples are included. In connection with these examples it will be noted that the oxyalkylation of para-cyclohexylcyclohexanol, that is, by treatment with ethylene oxide or propylene oxide, or a mixture of the two, is conventional. The procedure is conducted in the same manner employed in connection with other alcohols or the like, and generally an alkaline catalyst, is employed.

*Example 1*

The reaction vessel employed was a stainless steel autoclave with the usual devices for heating, heat control, stirrer, inlet, outlet, etc., which is conventional in this type of apparatus. The capacity was approximately 40 gallons. The stirrer operated at a speed of approximately 250 R. P. M. There were charged into the autoclave 18.2 pounds of para-cyclohexylcyclohexanol. There were then added 12½ ounces (approximately 5% by weight) of ground caustic soda. The autoclave was sealed, swept with nitrogen gas, and stirring started immediately and heat applied, and the temperature allowed to rise to approximately 150° C. At this point addition of propylene oxide was started. It was added continuously at such speed that it was absorbed by the reaction as rapidly as added. The amount of propylene oxide added was 104 pounds. The time required to add this propylene oxide was slightly in excess of one hour, about 1¼ hours. During this time the temperature was maintained at 150° to 160° C., using cooling water through the inner coils when necessary, and otherwise, applying heat, if required. At the end of the addition of the propylene oxide there was added ethylene oxide, as previously indicated. The amount of ethylene oxide added was 92.4 pounds. The temperature employed, and operating conditions, were the same as with the addition of propylene oxide. It is to be noted, however, that ethylene oxide appears to be more reactive and the reaction seems to require a greater amount of cooling water to hold the temperature range indicated. The time required to add the ethylene oxide was about the same, or slightly less, usually just a little more than an hour.

During the addition of the oxides the pressure was held at approximately 50 pounds per square inch gauge pressure, or less. When all the oxide had been added (ethylene oxide being the final addition in this particular instance) the autoclave wer permitted to stay at the same temperature range for another half hour, even longer if required, or until the gauge pressure had been reduced to zero, or substantially zero, indicating the reaction was complete. The final product was an oily material, somewhat viscous in nature, resembling castor oil and having an odor suggestive of para-cyclohexylcyclohexanol. It was soluble in water and also soluble in non-aqueous solvents, such as aromatic hydrocarbons, and others, although not soluble in some non-polar hydrocarbon solvents. The final yield was substantially the total weight of the initial reactants.

Example 2

The same procedure was followed as in Example 1, preceding, except that the order of addition of the oxides was reversed, the ethylene oxide being added first and the propylene oxide last. The time period, temperature range, pressure, etc., were kept the same as in Example 1, preceding.

Example 3

The same procedure was followed as in Example 1, except that a mixture, to wit, 196.4 pounds of propylene oxide and ethylene oxide, were added over a two-hour period. This mixture of ethylene oxide and propylene oxide was obtained from 104 pounds of propylene oxide and 92.4 pounds of ethylene oxide. In this instance again the time range, temperature, and pressure, were kept the same as in Example 1, preceding.

Example 4

The same procedure as in Example 1, preceding, was conducted on a laboratory scale employing a small autoclave having a capacity of approximately one liter, or up to a 5-gallon size. The amount of para-cyclohexylcyclohexanol employed was 36.4 grams, the amount of propylene oxide employed was 208.0 grams, and the amount of ethylene oxide employed was 184.8 grams. The amount of caustic soda used as a catalyst was 2.33 grams. The operating conditions were substantially the same as on a larger scale. Actually, the reaction seemed to go faster in the small autoclave and the time of absorption could be reduced, if desired. In many instances absorption would take place in the laboratory autoclave in a fraction of the time required in the larger autoclave; in fact, in many instances absorption was complete in 5 to 10 or 15 minutes, as compared to one hour on a larger scale. Needless to say, on a large scale, addition must be conducted carefully, because there is an obvious hazard in handling a large quantity of material in an autoclave, which is not necessarily present in the use of a small vessel.

Example 5

The same procedure was followed as in Example 4, preceding, in every respect, except the variation described in Example 2, preceding, i. e., the ethylene oxide, was added first and the propylene oxide added last.

Example 6

The same procedure was followed as in Example 4, in every instance, except the modification previously described in Example 3, to wit, the propylene oxide and the ethylene oxide were mixed together and added in approximately 15 minutes to one-half hour. In all other respects, the procedure was identical with that described in Example 4.

The following table includes a series of compounds or cogeneric mixtures which have been selected as exemplifying the herein included products. Types of the herein noted compounds or cogeneric mixtures have been produced in three different ways: (a) first adding propylene oxide and then ethylene oxide; (b) first adding ethylene oxide and then propylene oxide; and (c) mixing the ethylene oxide and the propylene oxide together and adding them simultaneously.

The data are summarized in the following table:

| Ex. No. | Para-Cyclohexyl-Cyclohexanol | | | Propylene Oxide | | | Ethylene Oxide | | | Point on Graph Identifying Specific Glycol Ether |
|---|---|---|---|---|---|---|---|---|---|---|
| | Weight Used, in Grams | Molal Ratio | Weight Per Cent in Final Glycol Ether | Weight Used, in Grams | Molal Ratio | Weight Per Cent in Final Glycol Ether | Weight Used, in Grams | Molal Ratio | Weight Per Cent in Final Glycol Ether | |
| A | 182 | 1.0 | 15.0 | 546 | 9.42 | 45.0 | 486 | 11.05 | 40.00 | 1 |
| B | 182 | 1.0 | 10.0 | 912 | 15.72 | 50.0 | 730 | 16.6 | 40.0 | 2 |
| C | 182 | 1.0 | 5.0 | 2,008 | 34.6 | 55.0 | 1,460 | 33.2 | 40.0 | 3 |
| D | 182 | 1.0 | 10.0 | 820 | 14.12 | 45.0 | 820 | 18.7 | 45.0 | 4 |
| E | 182 | 1.0 | 5.0 | 1,825 | 31.5 | 50.0 | 1,645 | 37.4 | 45.0 | 5 |
| F | 182 | 1.0 | 5.0 | 1,640 | 28.3 | 45.0 | 1,825 | 41.5 | 50.0 | 6 |
| G | 182 | 1.0 | 8.5 | 1,040 | 17.95 | 48.5 | 924 | 21.0 | 43.0 | 7 |
| H | 182 | 1.0 | 9.8 | 912 | 15.72 | 49.0 | 766 | 17.4 | 41.2 | (¹) |
| I | 182 | 1.0 | 9.5 | 930 | 16.05 | 48.5 | 806 | 18.35 | 42.0 | (¹) |
| J | 182 | 1.0 | 9.2 | 938 | 16.15 | 47.4 | 860 | 19.55 | 43.4 | (¹) |
| K | 182 | 1.0 | 8.8 | 955 | 16.5 | 46.2 | 932 | 21.15 | 45.0 | (¹) |
| G | 182 | 1.0 | 8.5 | 1,040 | 17.95 | 48.5 | 924 | 21.0 | 43.0 | ²7 |
| L | 182 | 1.0 | 8.5 | 1,040 | 17.95 | 48.5 | 924 | 21.0 | 43.0 | (¹) |
| M | 182 | 1.0 | 8.4 | 1,012 | 17.45 | 46.6 | 976 | 22.1 | 45.0 | (¹) |
| N | 182 | 1.0 | 8.2 | 1,100 | 18.95 | 49.5 | 940 | 21.35 | 42.3 | (¹) |
| O | 182 | 1.0 | 7.8 | 1,112 | 19.2 | 47.6 | 1,040 | 23.65 | 44.6 | (¹) |
| P | 182 | 1.0 | 7.5 | 1,168 | 20.1 | 48.2 | 1,075 | 24.45 | 44.3 | (¹) |
| Q | 182 | 1.0 | 7.0 | 1,274 | 21.95 | 49.0 | 1,145 | 26.0 | 44.0 | (¹) |
| R | 182 | 1.0 | 6.0 | 1,500 | 25.9 | 49.4 | 1,352 | 30.75 | 44.6 | (¹) |
| S | 182 | 1.0 | 20.0 | 236.5 | 4.07 | 26.0 | 491.5 | 11.15 | 54.0 | (³) |
| T | 182 | 1.0 | 4.0 | 1,182 | 20.4 | 26.0 | 3,182 | 72.4 | 70.0 | (³) |
| U | 182 | 1.0 | 4.0 | 3,460 | 59.6 | 76.0 | 910 | 20.65 | 20.0 | (³) |
| V | 182 | 1.0 | 20.0 | 546 | 9.41 | 60.0 | 182 | 4.14 | 20.0 | (³) |

¹ Within inner triangular area.
² Duplicated for covenience.
³ Indicates limits of trapezoidal area.

In the preparation of the above compounds the alkaline catalyst used was either flake caustic soda finely ground with mortar and pastle, or powdered sodium methylene, equivalent to 5% by weight of the para-cyclohexylcyclohexanol which was employed.

For reasons which are pointed out hereinafter in greater detail, it is substantially impossible to use conventional methods and obtain a single glycol ether of the kind described. Actually, one obtains a cogeneric mixture of closely related or touching homologues. These materials invariably have high molecular weights and cannot be separated from one another by any known method without decomposition. The properties of such a mixture represent the contribution of the various individual members of the mixture.

Although one cannot draw a single formula and say that by following such and such procedure, one can obtain 80% or 90% or 100% of such single compound, yet one can readily draw the formulae of a large number of compounds which appear in some of the mixtures described elsewhere, or can be prepared readily as components of mixtures which are manufactured conventionally. Such formulae, representing significant portions of various mixtures are of distinct value, insofar that they themselves characterize the invention, i. e., describe individual components which are typical of the members of the cogeneric mixture. In the following formulae, since ROH can represent para-cyclohexylcyclohexanol, RO is the ether radical obtained from para-cyclohexylcyclohexanol by removal of the hydrogen atom attached to the oxygen atom.

(1) $RO(C_2H_4O)_{20}(C_3H_6O)_{18}H$
(2) $RO(C_2H_4O)_{21}(C_3H_6O)_{18}H$
(3) $RO(C_2H_4O)_{22}(C_3H_6O)_{18}H$
(4) $RO(C_2H_4O)_{21}(C_3H_6O)_{19}H$
(5) $RO(C_2H_4O)_{22}(C_3H_6O)_{19}H$
(6) $RO(C_2H_4O)_{23}(C_3H_6O)_{19}H$
(7) $RO(C_2H_4O)_{23}(C_3H_6O)_{20}H$
(8) $RO(C_2H_4O)_{24}(C_3H_6O)_{20}H$
(9) $RO(C_3H_6O)_{18}(C_2H_4O)_{20}H$
(10) $RO(C_3H_6O)_{18}(C_2H_4O)_{21}H$
(11) $RO(C_3H_6O)_{18}(C_2H_4O)_{22}H$
(12) $RO(C_3H_6O)_{19}(C_2H_4O)_{21}H$
(13) $RO(C_3H_6O)_{19}(C_2H_4O)_{22}H$
(14) $RO(C_3H_6O)_{19}(C_2H_4O)_{23}H$
(15) $RO(C_3H_6O)_{20}(C_2H_4O)_{23}H$
(16) $RO(C_3H_6O)_{8}(C_2H_4O)_{21}(C_3H_6O)_{10}H$
(17) $RO(C_3H_6O)_{9}(C_2H_4O)_{21}(C_3H_6O)_{9}H$
(18) $RO(C_3H_6O)_{10}(C_2H_4O)_{21}(C_3H_6O)_{8}H$
(19) $RO(C_3H_6O)_{8}(C_2H_4O)_{21}(C_3H_6O)_{10}H$
(20) $RO(C_3H_6O)_{7}(C_2H_4O)_{21}(C_3H_6O)_{11}H$
(21) $RO(C_2H_4O)_{10}(C_3H_6O)_{18}(C_2H_4O)_{11}H$
(22) $RO(C_2H_4O)_{11}(C_3H_6O)_{18}(C_2H_4O)_{10}H$
(23) $RO(C_2H_4O)_{12}(C_3H_6O)_{18}(C_2H_4O)_{9}H$
(24) $RO(C_2H_4O)_{13}(C_3H_6O)_{18}(C_2H_4O)_{8}H$
(25) $RO(C_3H_6O)_{9}(C_2H_4O)_{9}(C_3H_6O)_{8}(C_2H_4O)_{13}H$
(26) $RO(C_3H_6O)_{9}(C_2H_4O)_{10}(C_3H_6O)_{8}(C_2H_4O)_{12}H$
(27) $RO(C_3H_6O)_{8}(C_2H_4O)_{11}(C_3H_6O)_{9}(C_2H_4O)_{11}H$
(28) $RO(C_3H_6O)_{8}(C_2H_4O)_{12}(C_3H_6O)_{9}(C_2H_4O)_{10}H$
(29) $RO(C_2H_4O)_{11}(C_3H_6O)_{10}(C_2H_4O)_{9}(C_3H_6O)_{9}H$
(30) $RO(C_2H_4O)_{10}(C_3H_6O)_{10}(C_2H_4O)_{10}(C_3H_6O)_{9}H$
(31) $RO(C_2H_4O)_{10}(C_3H_6O)_{9}(C_2H_4O)_{10}(C_3H_6O)_{10}H$
(32) $RO(C_2H_4O)_{9}(C_3H_6O)_{9}(C_2H_4O)_{11}(C_3H_6O)_{10}H$

If one selects any hydroxylated compound and subjects such compound to oxyalkylation, such as oxyethylation or oxypropylation, it becomes obvious that one is really producing a polymer of the alkylene oxide, except for the terminal group. This is particularly true where the amount of oxide added is comparatively large, for instance, 10, 20, 30, 40, or 50 units. If such a compound is subjected to oxyethylation so as to introduce 30 units of ethylene oxide, it is well known that one does not obtain a single constituent, which, for the sake of convenience, may be indicated as $RO(C_2H_4O)_{30}H$. Instead, one obtains a cogeneric mixture of closely related homologues in which the formula may be shown as the following: $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Paul J. Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means that from the practical standpoint, i. e., the ability to describe how to make the product under consideration and how to repeat such production time after time without difficulty, it is necessary to resort to some other method of description.

Actually, from a practical standpoint it is much more satisfactory, perhaps, to describe the ultimate composition in terms of the reactants, i. e., para-cyclohexylcyclohexanol and the two alkylene oxides. The reason for this statement is the following: If one selects a specific compound, it must be borne in mind that such compound is specific only insofar that the cogeneric mixture in terms of a statistical average will conform to this formula. This may be illustrated by an example such as $RO(C_3H_6O)_{18}(C_2H_4O)_{21}H$. If one combines the reactants in the predetermined weight ratio so as to give theoretically this specific component, and assuming that only one chemical compound were formed, what happens is that, although this particular compound may be present in a significant amount and probably less than 50%, actually one obtains a cogeneric mixture of touching homologues, in which the statistical average does correspond to this formula. For instance, selecting reactants, which, at least theoretically, could give the single compound $RO(C_3H_6O)_{18}(C_2H_4O)_{21}H$, what actually happens is that one obtains a sort of double cogeneric mixture, for the reason that in each batch or continuous addition of an alkylene oxide a cogeneric mixture is formed. Since the present products require the addition of at least two different multi-molar proportions of each of two different alkylene oxides (ethylene oxide and propylene oxide) it becomes obvious that a rather complex cogeneric mixture must result.

This can be best illustrated by example. Assume that one is going to use the indicated ratio, to wit, one pound mole of para-cyclohexylcyclohexanol, 18 pound moles of propylene oxide and 21 pound moles of ethylene oxide. The initial step involves the treatment of one pound mole of para-cyclohexylcyclohexanol with 18 pound moles of propylene oxide so as to yield theoretically $RO(C_3H_6O)_{18}H$; actually, as pointed out, one does not obtain $RO(C_3H_6O)_nH$, in which $n$ is 18, but really one obtains a cogeneric mixture, in which there are present significant amounts of homologues in which $n$ varies from 10, 11 and 12 on up to 23, 24 and possibly 25 or 26. A statistical average, however, must, of course, correspond to the proportion of the initial reactants, i. e., a compound of the formula $RO(C_3H_6O)_{18}H$, which is present undoubtedly to a significant extent.

When this cogeneric mixture is then subjected to reaction with 21 moles of ethylene oxide, it becomes obvious that, although one may obtain some $RO(C_3H_6O)_{18}(C_2H_4O)_{21}H$, yet this particular product can be present only to a minor extent, for reasons which have been described in connection with oxyethylation and which now are magnified to a greater degree by oxypropylation. Stated another way, it is probable that the cogeneric mixture represents something like $RO(C_3H_6O)_n(C_2H_4O)_{n'}H$, in which, as previously pointed out, components present in important percentages are those in which $n$ could vary from anywhere beginning with 10 to 12, on up to 20, or 24 to 26. By the same token, components present in important percentages are those in which $n'$ could vary anywhere from 13 or 14 up to the higher 20's, such as 26, 27, 28, or 29. Indeed, homologues of a lower or a higher value of $n$ and $n'$ will be present in minor amounts, the percentage of such components decreasing, the further removed they are from the average composition. However, in spite of such variation in regard to the cogeneric mixture, the ultimate composition, based on the ingredients which enter into it and based on the statistical average of such constituents, can still be expressed by the formula $RO(C_3H_6O)_{18}(C_2H_4O)_{21}H$. This actual product exists to some degree in the cogeneric mixture, but it should be looked upon as a statistical average formula rather than the structure of a single or predominant compound in the mixture.

A second reason for employing a reaction mixture to describe the product, is the fact that the molal proportions need not represent whole numbers. We have just pointed out that if one selects molal proportions corresponding to $RO(C_3H_6O)_{18}(C_2H_4O)_{21}H$, then the constituents are added in actual molar proportions, based on whole numbers. If, however, one selects a point in the inner triangular area of the accompanying graph, which, when recalculated in terms of molal proportions, produces a fractional number, there is still no reason why such proportion of initial reactant should not be adopted. For instance, one might select a point in the triangular graph, which, when calculated in terms of molecular proportions, represents a formula, such as the following:

$$RO(C_3H_6O)_{18.5}(C_2H_4O)_{21}H$$

This, of course, would be immaterial, for the reason that if one starts with a pound mole of para-cyclohexylcyclohexanol and adds 18.5 pound moles of propylene oxide, one will obtain, on the average, a mixture closely comparable to the one previously described, using exactly 18 pound moles of propylene oxide instead of 18.5. Such mixture corresponds to the compound $RO(C_3H_6O)_{18.5}H$ only in the sense of the average statistical value, but not in the sense that there actually can be a compound corresponding to such formula. Further discussion of this factor appears unnecessary in light of what has been said previously.

Such mixture could, of course, be treated with 21 pound moles of ethylene oxide. Actually, all that has been said sums up to this, and that is, that the most satisfactory way, as has been said before, of indicating actual materials obtained by the usual and conventional oxyalkylation process is in terms of the initial reactants, and it is obvious that any particular point on the triangular graph, from a practical aspect, invariably and inevitably represents the statistical average of several or possibly a dozen or more closely related cogeners of almost the same composition, but representing a series of touching homologues. The particular point selected represents at least the composition of the mixture expressed empirically in the terms of a compound representing the statistical average.

Previous reference has been made to the fact that comparatively few oxyalkylated derivatives of simple hydroxylated compounds find utility in actual demulsification practice. We have pointed out that we have found a very few exceptions to this rule. The fact that exceptions exist, as in the instant invention, is still exceedingly difficult to explain if one examines the slight constribution that the end group, derived from the hydroxylated material, makes to the entire compound. Referring for the moment to a product of the kind which has been described and identified by the formula $$RO(C_3H_6O)_{18}(C_2H_4O)_{21}H$$

it becomes apparent that the molecular weight is in the neighborhood of 2100 and actually the para-cyclohexylcyclohexanol contributes less than 10% of the molecular weight. As a matter of fact, in other comparable compounds the para-cyclohexylcyclohexanol may contribute as little as 4% or 5% and yet these particular compounds are effective demulsifiers. Under such circumstances, it would seem reasonable to expect that some other, or almost any other, cyclic 6-carbon atom compound comparable to para-cyclohexylcyclohexanol would yield derivatives equally effective. Actually, this is not the case. We know of no theory or explanation to suggest this highly specific nature or action of the compound or cogeneric mixture derived from para-cyclohexylcyclohexanol.

Referring to an examination of the previous list of 32 compounds, it is to be noted that in certain examples, for instance, Examples 9 to 15, inclusive, all the propylene oxide is added first and then the ethylene oxide is added. Compounds indicated by Examples 1 to 8 are substantially the same as far as composition goes, but are reversed, insofar that the ethylene oxide is added first and then the propylene oxide. Other compounds having substantially the same ultimate composition, or at least very closely related ultimate compositions, having a further variation in the distribution of the propylene oxide and ethylene oxide, are exemplified by Formulae 16 to 32, inclusive.

As has been pointed out previously, for some reason which we do not understand and for which we have not been able to offer any satisfactory theory, we have found that the best compounds, or more properly, cogeneric mixtures, are obtained when all the propylene oxide is added first and then all the ethylene oxide is added. Although this is true to at least some extent in regard to all compositions within the trapezoidal area in the triangular graph, yet it is particularly true if the composition comes within the segment of the circle of the accompanying drawing. In such event, one obtains a much more effective demulsifier than by any other combination employing ethylene oxide alone, propylene oxide alone, or any variation in the mixture of the two, as illustrated by other formulae. In fact the compound or cogeneric mixture so obtained, as far as demulsification is concerned, is not infrequently at least one-third better than any other derivative obtained in the manner described involving any of the other above variations.

The significance of what has been said previously becomes more emphatic when one realizes that, in essence, we have found that one "isomer" is a more effective demulsifying agent than another "isomer." The word "isomer" is not exactly right, although it is descriptive for the purpose intended, insofar that we are not concerned with a single compound, but with a cogeneric mixture, which, in its statistical average, corresponds to such compound. Stated another way, if we start with one pound mole of para-cyclohexylcyclohexanol, 18 pound moles of propylene oxide and 21 pound moles of ethylene oxide, we can prepare two different cogeneric mixtures, which, on a statistical average, correspond to the following:

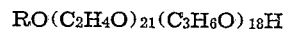

and

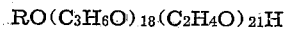

There is nothing we know which would suggest that the latter be a much more effective demulsifying agent than the former and also that it be more effective for other industrial purposes. The applicants have had wide experience with a wide variety of surface-active agents, but they are unaware of any other similar situation, with the exception of a few instances which are the subject-matter of other co-pending applications, or are under investigation. This feature represents the invention within an invention previously referred to, and thus, becomes the specific subject-matter claimed in our co-pending applications Serial Nos. 124,817 and 124,818, both filed November 1, 1949.

Reference has been made to the fact that the product herein specified, and particularly for use as a demulsifier, represents a cogeneric mixture of closely related homologues. This does not mean that one could not use combinations of such cogeneric mixtures. For instance, in the previous table data have been given for preparation of cogeneric mixtures which statistically correspond, respectively, to points 1, 3 and 6. Such three cogeneric mixtures could be combined in equal weights so as to give a combination in which the mixed statistical average would correspond closely to point 7.

Similarly, one could do the same thing by preparing cogeneric mixtures corresponding to points 2, 4 and 5 described in the previous table. Such mixture could then be combined in equal parts by weight to give another combination which would closely correspond on a mixed statistical basis to point 7. Nothing said herein is intended to preclude such combinations of this or similar type.

We need not add that instead of subjecting para-cyclohexylcyclohexanol alone to oxyethylation and oxypropylation, or, inversely, to oxypropylation and oxyethylation, or simultaneous treatment with both oxides, one can employ a mixture of cyclohexylcyclohexanol along with some other desired reactant such as alpha-terpineol. For a number of reasons, it is ordinarily desirable to use a procedure in which only one product is reacted at a time.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000 or even 1 to 40,000, or 1 to 50,000, as in desalting practice, such an apparent insolublity in oil and water is not significant because said reagents undoubtedly have solubility within such concentrations. This same fact is true in regard to the material or materials employed as the demulsifying agent of our process.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1, with 15 parts by weight of xylene and 10 parts by weight of isopropyl alcohol, an excellent demulsifier is obtained. Selection of the solvent will vary, depending upon the solubility characteristics of the oxyalkylated product, and of course, will be dictated in part by economic considerations, i. e., cost.

As noted above, the products herein described may be used not only in diluted form, but also may be used admixed with some other chemical demulsifier. For example, a mixture which exemplifies such combination is illustrated by the following:

Oxyalkylated derivative, for example, the product of Example 1, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Throughout the specification elsewhere reference has been made to homologues. It is quite likely that it would be equally proper in numerous instances, and perhaps in all the herein described products, to refer to isomers as well as homologues. The reason for this statement is that propylene oxide, as differentiated from ethylene oxide, can, at least theoretically, combine with a hydroxyalkylated material ROH to give two different derivatives, one being a primary alcohol and the other a secondary alcohol. This is illustrated by the following:

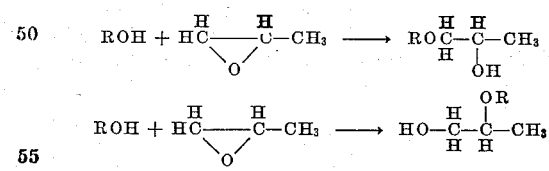

Elsewhere in the specification the word "isomer" has been used thus: "isomer." It is not believed there is any confusion between such terminology in that particular instance and what is said immediately preceding.

Having thus described our invention, what we claim as new and desire to secure by Letters Patent is:

1. A process for breaking petroleum emulsions of the water-in-oil type, characterized by subjecting the emulsion to the action of a demulsifier including at least one cogeneric mixture of a homologous series of glycol ethers of para-cyclohexylcyclohexanol; said cogeneric mixture being derived exclusively from para-cyclohexylcyclohexanol, ethylene oxide and propylene oxide in such weight proportions so the average composition of said cogeneric mixture stated in terms of initial reactants lies approximately within the trapezoidal area of the graph in the accompanying drawing defined approximately by points 8, 9, 10 and 11.

2. A process for breaking petroleum emulsions of the water-in-oil type, characterized by subjecting the emulsion to the action of a demulsifier including a cogeneric mixture of a homologous series of glycol ethers of para-cyclohexylcyclohexanol; said cogeneric mixture being derived exclusively from para-cyclohexylcyclohexanol, ethylene oxide and propylene oxide in such weight proportions so the average composition of said cogeneric mixture stated in terms of initial reactants lies approximately within the trapezoidal area of the graph in the accompanying drawing defined approximately by points 8, 9, 10 and 11.

3. A process for breaking petroleum emulsions of the water-in-oil type, characterized by subjecting the emulsion to the action of a demulsifier including a cogeneric mixture of a homologous series of glycol ethers of para-cyclohexylcyclohexanol; said cogeneric mixture being derived exclusively from para-cyclohexylcyclohexanol, ethylene oxide and propylene oxide in such weight proportions so the average composition of said cogeneric mixture stated in terms of initial reactants lies approximately within the segment of the circle of the graph in the accompanying drawing in which the minimum para-cyclohexylcyclohexanol content is at least 4% and which circle is identified by the fact that points 1, 3, and 6 lie on its circumference.

4. A process for breaking petroleum emulsions of the water-in-oil type, characterized by subjecting the emulsion to the action of a demulsifier including a cogeneric mixture of a homologous series of glycol ethers of para-cyclohexylcyclohexanol; said cogeneric mixture being derived exclusively from para-cyclohexylcyclohexanol, ethylene oxide and propylene oxide in such weight proportions so the average composition of said cogeneric mixture stated in terms of initial reactants lies approximately within the triangular area of the graph in the accompanying drawing defined by points 1, 3, and 6.

5. A process for breaking petroleum emulsions of the water-in-oil type, characterized by subjecting the emulsion to the action of a demulsifier including a cogeneric mixture of a homologous series of glycol ethers of para-cyclohexylcyclohexanol; said cogeneric mixture being derived exclusively from para-cyclohexylcyclohexanol, ethylene oxide and propylene oxide in such weight proportions so the average composition of said cogeneric mixture stated in terms of initial reactants lies approximately within the triangular area of the graph in the accompanying drawing defined by points 2, 4 and 5.

6. A process for breaking petroleum emulsions of the water-in-oil type, characterized by subjecting the emulsion to the action of a demulsifier including a cogeneric mixture of a homologous series of glycol ethers of para-cyclohexylcyclohexanol; said cogeneric mixture being derived exclusively from para-cyclohexylcyclohexanol, ethylene oxide and propylene oxide in such weight proportions so that average composition of said cogeneric mixture stated in terms of initial reactants lies approximately at point 7 in the graph in the accompanying drawing.

7. A process for breaking petroleum emulsions of the water-in-oil type, characterized by subjecting the emulsion to the action of a demulsifier including a single cogeneric mixture of a homologous series of glycol ethers of para-cyclohexylcyclohexanol; said cogeneric mixture being derived exclusively from para-cyclohexylcyclohexanol, ethylene oxide and propylene oxide in such weight proportions so the average composition of said cogeneric mixture stated in terms of initial reactants lies approximately at point 7 in the graph in the accompanying drawing.

MELVIN DeGROOTE.
ARTHUR F. WIRTEL.
OWEN H. PETTINGILL.

REFERENCES CITED

The following references are of record in the file of this patent:

UNITED STATES PATENTS

| Number | Name | Date |
|---|---|---|
| 2,130,525 | Coleman et al. | Sept. 20, 1938 |
| 2,176,834 | Bruson | Oct. 17, 1939 |
| 2,213,477 | Steindorff et al. | Sept. 3, 1940 |
| 2,233,383 | De Groote et al. | Feb. 25, 1941 |
| 2,243,330 | De Groote et al. | May 27, 1941 |
| 2,307,058 | Moeller | Jan. 5, 1943 |
| 2,317,726 | Boedeker et al. | Apr. 27, 1943 |
| 2,330,474 | De Groote | Sept. 28, 1943 |
| 2,425,755 | Roberts et al. | Aug. 19, 1947 |
| 2,425,845 | Toussaint et al. | Aug. 19, 1947 |